US010057344B2

(12) United States Patent
Clemm et al.

(10) Patent No.: US 10,057,344 B2
(45) Date of Patent: Aug. 21, 2018

(54) EFFICIENT TRANSPORT OF DATA ENCODED USING MULTIPLE TEMPLATES

(71) Applicant: Cisco Technology, Inc., San Jose, CA (US)

(72) Inventors: Alexander Clemm, Los Gatos, CA (US); Eric Voit, Bethesda, MD (US); Alberto Gonzalez Prieto, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 311 days.

(21) Appl. No.: 15/095,502

(22) Filed: Apr. 11, 2016

(65) Prior Publication Data

US 2017/0295231 A1 Oct. 12, 2017

(51) Int. Cl.
*H04L 29/08* (2006.01)

(52) U.S. Cl.
CPC ...... *H04L 67/1095* (2013.01); *H04L 67/1097* (2013.01); *H04L 67/26* (2013.01)

(58) Field of Classification Search
None
See application file for complete search history.

(56) References Cited

U.S. PATENT DOCUMENTS

| 2015/0249593 | A1* | 9/2015 | Alvarez | H04L 41/0803 370/241 |
| 2016/0149761 | A1* | 5/2016 | Liu | H04L 41/0843 709/221 |
| 2017/0180321 | A1* | 6/2017 | Nimmagadda | H04L 63/0263 |
| 2017/0180423 | A1* | 6/2017 | Nimmagadda | H04L 63/20 |

* cited by examiner

*Primary Examiner* — Natisha D Cox
(74) *Attorney, Agent, or Firm* — Hickman Palermo Becker Bingham LLP

(57) ABSTRACT

Techniques related to efficient transport of data encoded using multiple templates are disclosed. A sending computing device sends an internet message including internet message segments toward a receiving computing device. The internet message stores information about a data object that includes property types corresponding to property values. A portion of the data object includes multiple instances of a particular property type, and each instance corresponds to a property value. The internet message segments store the property values according to multiple templates, and each internet message segment corresponds to a template. Among the multiple templates is a particular template for the portion of the data object that includes the multiple instances of the particular property type. The multiple templates include fields that correspond to field identifiers. Based on a property-type-to-field-identifier mapping, a corresponding property type can be determined for each property value that is stored in the internet message segments.

20 Claims, 10 Drawing Sheets

FIG. 2

PROPERTY-TYPE-TO-FIELD-IDENTIFIER MAPPING 200

| PROPERTY TYPE 102 | FIELD IDENTIFIER 202 |
|---|---|
| last-update | 1 |
| time | 2 |
| date | 3 |
| location | 4 |
| name | 5 |
| gender | 6 |
| age | 7 |

FIG. 5

TABLE 500

| DATA OBJECT 502 | NUMBER OF DIFFERENT PROPERTY TYPES 506 | PREDETERMINED NUMBER 508 |
|---|---|---|
| SUBDIVISION 504A | 500,000 | 65,536 |
| SUBDIVISION 504B | 65,536 | 65,536 |
| SUBDIVISION 504C | 65,536 | 65,536 |
| ... | 65,536 | 65,536 |
| SUBDIVISION 504N | ... | ... |
| | 41,248 | 65,536 |

FIG. 6

MAPPING-TO-TEMPLATE MAPPING 600

| MAPPING IDENTIFIER 602 | TEMPLATE IDENTIFIER 302 |
|---|---|
| 200A | 816 |
| 200B | 817 |
| 200C | 818 |
| 200D | 819 |
| 200E | 820 |
| ... | ... |
| 200N | 999 |

EFFICIENT TRANSPORT OF DATA ENCODED USING MULTIPLE TEMPLATES

FIELD OF THE DISCLOSURE

The present disclosure generally relates to data communications technology. More specifically, the example embodiment(s) of the present disclosure relate to efficient transport of data encoded using multiple templates.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As computing devices communicate larger amounts of data, there is an ever-increasing amount of strain on existing network infrastructure. An approach for relieving the strain is to replace infrastructure elements with higher capacity elements. For example, copper wires can be replaced with fiber optic cables. However, this approach can be cost-prohibitive, disruptive, and invasive. Thus, there is a need for an approach that uses the existing network infrastructure to efficiently accommodate high volumes of data.

SUMMARY

The appended claims may serve as a summary of the disclosure.

BRIEF DESCRIPTION OF THE DRAWINGS

In the drawings:

FIG. 2 depicts an example property-type-to-field-identifier mapping.

FIG. 5 is a table that depicts an approach for dividing a large data object into subdivisions.

FIG. 6 depicts an example mapping-to-template mapping.

Figure 1:
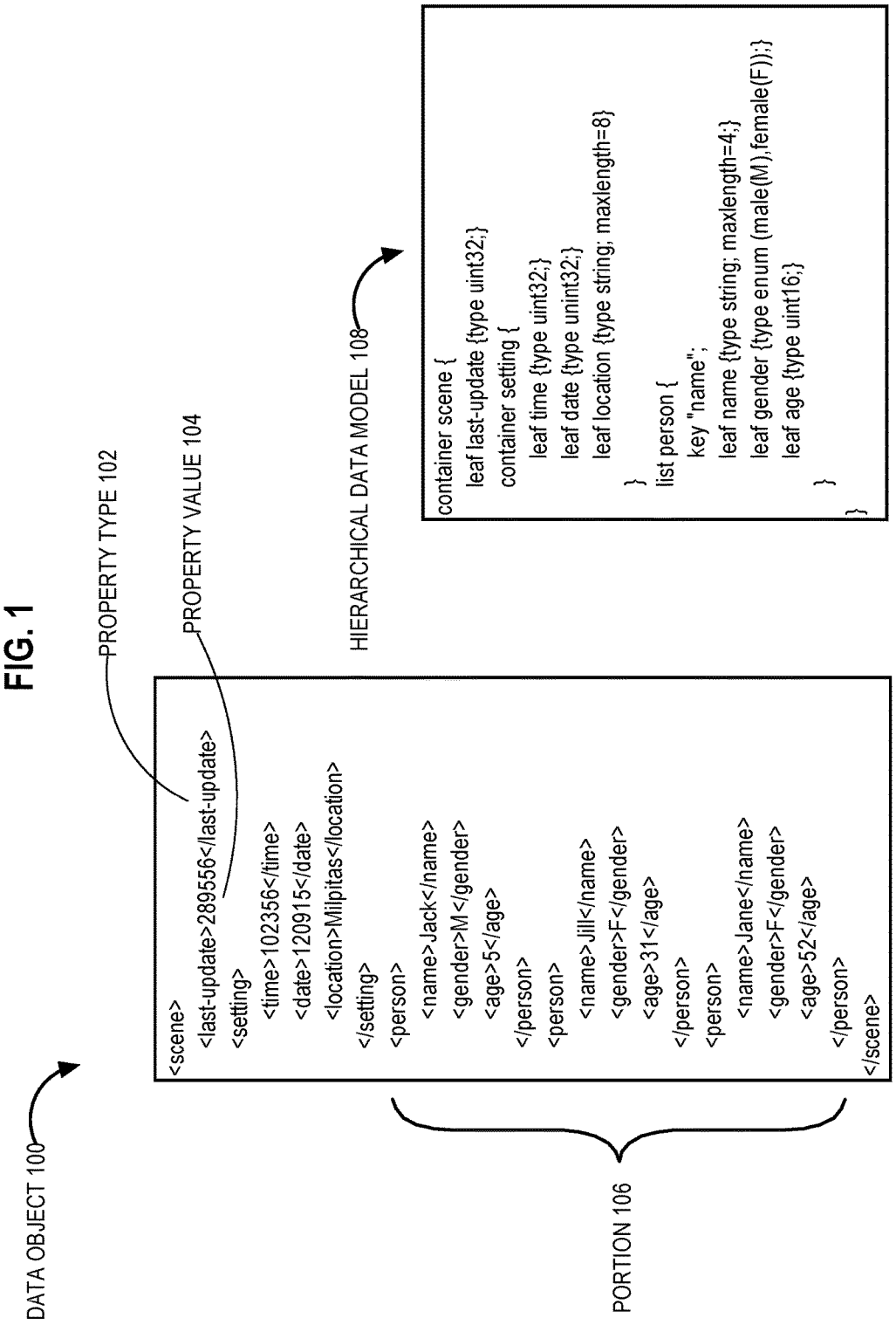
FIG. 1 depicts an example data object.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

Embodiments are described herein according to the following outline:

1.0 General Overview
2.0 Data Objects
　2.1 Structure of Data Objects
　2.2 Multiple Instances of a Property Type
3.0 Encoding Property Types
　3.1 Property-Type-to-Field-Identifier Mapping
　3.2 Template Structure
4.0 Storing Property Values
　4.1 Message Segments
　4.2 Segment Records
5.0 Field Identifier Exhaustion
　5.1 Data Object Subdivisions
　5.2 Multiple Mappings
6.0 Example Network Topology
　6.1 Sending Computing Device
　　6.1.1 Mapping Generation Logic
　　6.1.2 Template Generation Logic
　6.2 Receiving Computing Device
　　6.2.1 Template Determination Logic
　　6.2.2 Property-Type Determination Logic
7.0 Encoding Process Overview
　7.1 Obtaining a Data Object
　7.2 Generating a Property-Type-to-Field-Identifier Mapping
　7.3 Generating Templates
　7.4 Storing Property Values
　7.5 Sending an Internet Message
8.0 Decoding Process Overview
　8.1 Receiving an Internet Message
　8.2 Determining Corresponding Templates
　8.3 Determining Corresponding Property Types
9.0 Implementation Mechanisms-Hardware Overview
10.0 Extensions and Alternatives 1.0 General Overview A data object includes properties that can be categorized according to property types. For example, the data object may be structured according to a YANG data model and contain properties related to any of a variety of data, such as data related to a network flow. For network flow data, example properties may include a "source Internet Protocol (IP) address" property type, a "destination IP address" property type, and a "packet count" property type. The property types correspond to property values. For example, the "source IP address" property type may correspond to "192.168.0.1", the "destination IP address" property type may correspond to "192.168.0.2", and the "packet count" property type may correspond to "55". A portion of the data object includes multiple instances of a particular property type, and each instance corresponds to a property value. For example, the portion of the data object may be a list of network interfaces, and the list may include an "interface identifier" property type, a "status" property type, and a "utilization" property type for each of the network interfaces.

Efficient transport of the data object is achieved based on organizing the property values according to templates for storing the property values as data records in a network message. Each template defines a structure of a data record based on mapping property types to specific template fields that correspond to property values stored in the data record. For example, instead of transporting the data object as pairs of property types and property values, the data object may simply be transported as a series of property values. In other words, instead of making the property values self-describing, the templates can be used to infer a corresponding property type for each property value. More specifically, the templates include template fields that correspond to field identifiers. A property-type-to-field-identifier mapping correlates the property types to the template fields. Thus, when the property values are stored in data records according to the templates, a corresponding property type for each property value can be inferred based on the property value's relative location in a data record.

Further efficiency is achieved based on minimizing template sizes. Efficient transport of the templates is achieved based on generating a separate template for the portion of the data object that includes multiple instances of the particular property type. For example, instead of generating a template that includes the template fields "source IP address, destination IP address, packet count, interface identifier, status, utilization, interface identifier, status, utilization", further efficiency may be achieved by generating a first template that includes the template fields "source IP address, destination IP address, packet count" and a second template that includes the template fields "interface identifier, status, utilization" for each of many interfaces. Note that generating the second template as a separate template enables including a single instance of each of the template fields "interface identifier, status, utilization" in the second template. However, a data record that corresponds to the second template includes multiple property values for each template field, thereby storing a set of property values for each interface. For example, if six property values are stored according to a template with only three template fields, iterations of the three template fields can be inferred.

At least some of the property values are stored, according to the templates, in a network message, such as an Internet Protocol Information Export (IPFIX) message. The network message is segmented to contain multiple data records, and each network message segment corresponds to a data record. For example, "192.168.0.1", "192.168.0.2", and "55" may be stored in a first data record, and other property values may be stored in a second data record. A sending computing device, such as a network host, sends the network message toward a receiving computing device, such as a network device.

2.0 Data Objects

A sending computing device transmits, to a receiving computing device, data associated with a data object that is stored in the sending computing device. FIG. 1 depicts an example data object. Referring to FIG. 1, data object 100 includes property type 102, property value 104, and portion 106. Data object 100 is structured according to hierarchical data model 108.

At a high level, a data object 100 may be a container, a grouping, and/or any other organization of information. For example, a data object 100 may be one or more rows of a database table, one or more node clusters of a tree data structure, and/or one or more of any other collections of data. The data object 100 may store information using comma-separated values (CSV), Extensible Markup Language (XML), Javascript Object Notation (JSON), and/or any other format for storing structured data. In the example of FIG. 1, data object 100 stores information in an XML format. The information stored in a data object 100 may be any of a variety of data, such as network flow information.

2.1 Structure Of Data Objects

A data object 100 includes a plurality of property types that correspond to a plurality of property values. The plurality of property types and the plurality of property values may be related by a one-to-one relationship, a one-to-many relationship, a many-to-many relationship, and/or a many-to-one relationship. In the example of FIG. 1, the "name" property type corresponds to the property values "Jack", "Jill", and "Jane". The data object 100 also includes a plurality of properties that are associated with the plurality of property types. The plurality of properties and the plurality of property types may be related by a one-to-one relationship and/or a many-to-one relationship. In the example of FIG. 1, there are three "name" properties that are associated with the "name" property type. Thus, each property of the plurality of properties corresponds to one or more property values of the plurality of property values.

A property may be an attribute, a node, and/or any other element in a data object 100 that corresponds to a property value 104. For example, if a data object 100 is a row of a database table, a property may be represented as a column of the database table, and the property corresponds to property values stored in the column. As another example, if a data object 100 is a node cluster of a tree data structure, a property may be represented as an internal node, and the property corresponds to a property value represented as a leaf node that descends from the internal node.

A property type 102 may be a category, a name, and/or any other term used to collectively reference one or more identical properties. In the example of FIG. 1, there are three instances of the property "gender", and the three instances correspond to the property type 102 "gender".

A property value 104 may be one or more characters, numbers, and/or any other data described by a property and/or a property type 102 in a data object 100. Property values may be data stored in a database table column, a leaf node, and/or a part of any other data structure. In the example of FIG. 1, the property value "289556" is described by the property and/or the property type 102 "last-update".

In some example embodiments, a data object 100 may be structured according to a hierarchical data model 108. For example, a data object 100 may store information using XML, JSON, or any other format that can be used to encode a hierarchy of data. In some example embodiments, the hierarchical data model 108 may be described using a data definition language (DDL), such as YANG.

2.2 Multiple Instances Of A Property Type

A portion 106 of the data object 100 includes multiple instances of a particular property type. In the example of FIG. 1, portion 106 includes multiple instances of several property types: "name", "gender", and "age". A property is an instance of a property type 102. As mentioned above, a property corresponds to one or more property values. Thus, each instance of the particular property type corresponds to one or more property values. In the example of FIG. 1, the first instance of "name" corresponds to "Jack", the second instance corresponds to "Jill", and the third instance corresponds to "Jane".

In some example embodiments, each instance of the particular property type may correspond to one property value. For example, the portion 106 may correspond to a list of leaf nodes. In FIG. 1, portion 106 is a list of "person" containers that each include three leaf nodes. Each leaf node includes a property value 104 that is described by an instance of a property type 102.

As depicted in FIG. 1, storing the multiple instances may be verbose. Thus, transmitting the multiple instances without modification may inefficiently tie up computing and network resources, such as processor speed and communications bandwidth. As will be described in greater detail below, efficiency may be realized based on reducing an amount of data involved in communicating the multiple instances.

3.0 Encoding Property Types

In some example embodiments, reducing the amount of data involved in communicating the data object 100 may involve binary encoding of property types and property values. However, further efficiency can be achieved based on substituting tokens for property types. Typically, the tokens are efficient representations of the property types. For example, American Standard Code for Information Interchange (ASCII) can encode each letter of the property type 102 "name" using one byte for a total of four bytes. In contrast, a two-byte token, for example, can be used to represent the four-byte "name" property type while providing for 65,535 other two-byte tokens that can be used in lieu of property types. This approach, however, involves a mapping or other approach for correlating tokens to property types.

3.1 Property-Type-To-Field-Identifier Mapping

In some example embodiments, a token may be a field identifier that uniquely identifies a property type 102 that is stored in a property-type-to-field-identifier mapping. FIG. 2 depicts an example property-type-to-field-identifier mapping. Referring to FIG. 2, property-type-to-field-identifier mapping 200 correlates property type 102 with field identifer 202.

As will be described in greater detail below, a field identifier 202 is so named, because it uniquely identifies a field of a template. At a minimum, however, a field identifier 202 can be used to uniquely identify a property type 102 in an abbreviated form. In other words, different field identifiers reference different property types. In some example embodiments, a field identifer 202 may be a sixteen-bit binary number that references a property type 102 exceeding sixteen bits in length. Sixteen bits can provide for a pool of 65,536 different tokens while realizing a savings in data utilization.

In some example embodiments, a pool of tokens may include a standardized set of identifiers and/or one or more proprietary sets of identifiers. For example, the Internet Assigned Numbers Authority (IANA) reserves at least 300 pre-defined numbers known as "Information Element Identifiers" that can be used to identify different elements in a network message, and the pool of tokens may include numbers reserved by IANA. Additionally or alternatively, the pool of tokens may include numbers reserved by the Cisco Assigned Number Authority (CANA). In some example embodiments a flag may be used to indicate whether a particular token is associated with a standardized set of tokens or a proprietary set of tokens. For example, the flag may be a leading bit of a sixteen-bit identifier. "0" may indicate the standardized set, and "1" may indicate the proprietary set. As will be described in greater detail below, tokens may be dynamically assigned to the property types. For example, different data objects may include different property types but share an identical set of field identifiers.

In some example embodiments, a property-type-to-field-identifier mapping 200 maps a one-to-one relationship between a plurality of property types and a plurality of field identifiers that are stored in the property-type-to-field-identifier mapping 200. In other words, the property-type-to-field-identifier mapping 200 correlates a property type 102 to a respective field identifier of the plurality of field identifiers. Thus, it may be necessary to store property types, in their entireties, only once in a property-type-to-field-identifier mapping 200. Thereafter, tokens, such as field identifiers, may be used to reference the property types if necessary.

In the example of FIG. 2, property-type-to-field-identifier mapping 200 is depicted as consisting of property types and field identifiers. In FIG. 2, it is unnecessary to assign field identifiers to container elements, such as "setting" and "person", because they merely provide structure. However, in some example embodiments, container elements may be encoded as qualifiers for property types so that a hierarchical structure can be inferred based on the qualifiers. For example, a property-type-to-field-identifier mapping 200 may store the XML Path (XPath) expression "scene/person/name" as a property type 102.

In some example embodiments, a property-type-to-field-identifier mapping 200 may also store other information that can be used to encode a data object 100 as a stream of property values. For example, a property-type-to-field-identifier mapping 200 may also include a data type and/or a data length for property values that correspond to property types. Thus, the field identifer 202 "4" may correlate to the property type 102 "location", the data type "char[8]", and the data length "8 bytes". An example of such a property-type-to-field-identifier mapping 200 is provided below:

| Field Identifier | Property Type | Data Type | Number of Octets |
|---|---|---|---|
| 1 | last-update | uint32 | 4 |
| 2 | time | uint32 | 4 |
| 3 | date | uint32 | 4 |
| 4 | location | char[8] | 8 |
| 5 | name | char[4] | 4 |
| 6 | gender | char[2] | 2 |
| 7 | age | uint16 | 2 |

3.2 Template Structure

Figure 3:
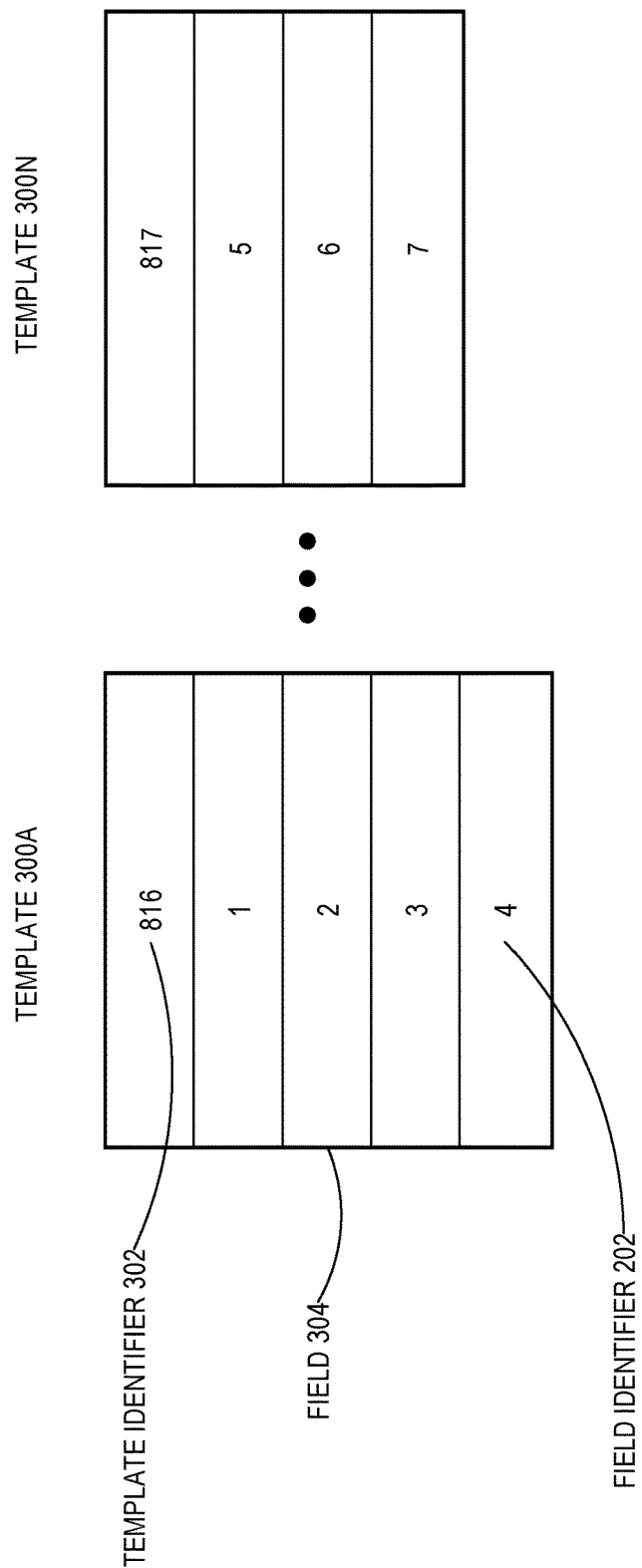
FIG. 3 depicts an example plurality of templates.

Further efficiency can be achieved based on templates that associate property types with locations of property values in a data stream. FIG. 3 depicts an example plurality of templates. Referring to FIG. 3, a plurality of templates 300A-N includes any number of templates 300A-N; the label "N" in "116N," and in any other reference numeral herein, connotes that any number of elements or items may be present or used in embodiments, as in "1 to n items". The plurality of templates 300A-N includes template 300A, which further includes template identifier 302, field 304, and field identifer 202.

Each template of the plurality of templates 300A-N can be used to organize one or more property values according to one or more fields of the template. Each field of the one or more fields is referenced by a field identifer 202 that corresponds to a particular property type. Thus, each field of the one or more fields indicates a relative storage location of a property value that corresponds to a particular property type. In some example embodiments, each field of the one or more fields corresponds to a different field identifier and a different property type.

At a high level, each template of the plurality of templates 300A-N defines boundaries between property values that are stored in a network message. For example, based on known lengths for property values, a first bit and/or a last bit of a particular property value can be determined. Thus, a template can be used to resolve a bit stream into component parts. For example, template 300N can be used to resolve the bit stream that encodes "817JackM5" into the template identifier 302 "817" and the property values "Jack", "M", and "5". More specifically, it may be known a priori that template identifiers are sixteen bits in length, so a sixteen-bit representation of "817" would be recognized as corresponding to a template identifier. Furthermore, based on a property-type-to-field-identifier mapping 200 that correlates data lengths with field identifiers, a respective length may be determined for each subsequent property value in the bit stream.

Additionally or alternatively, each template indicates a sequence according to which property values are stored in a network message. For example, template 300N organizes the field identifiers "5", "6", and "7" in a sequential order indicating that the property type 102 "name" is immediately followed by the property type 102 "gender", which is immediately followed by the property type 102 "age". Thus, template 300N can be used to determine that the data stream "817JackM5JillF31" includes the template identifier 302 "817", the property values "Jack" and "Jill" corresponding to the property type 102 "name", the property values "M" and "F" corresponding to the property type 102 "gender", and the property values "5" and "31" corresponding to the property type 102 "age". Note that one or more iterations of the sequence may be inferred based on an amount of data that exceeds a data length indicated in a template. For example, the data stream "817JackM5JillF31" is 144 bits in length, whereas template 300N accounts for only eighty bits of the data stream. Thus, the remaining sixty-four bits corresponds to a second set of property values.

The plurality of templates 300A-N includes a particular template, such as template 300N, that corresponds to portion 106 of data object 100. As mentioned above, portion 106 includes multiple instances of at least one particular property type. In the preceding example, portion 106 includes multiples instances of the property types "name", "gender", and "age". However, in some example embodiments, the particular template includes a single field that corresponds to multiple instances of a particular property type. For example, template 300N includes a single field that is referenced by the field identifer 202 "5", a single field that is referenced by the field identifer 202 "6", and a single field that is referenced by the field identifer 202 "7". Thus, template 300N is a compact version of a template that includes multiple fields that each correspond to an identical property type.

Each template of the plurality of templates 300A-N includes a template identifier 302. A template identifer 302 uniquely identifies a template. A plurality of templates 300A-N and/or template identifiers may be dynamically generated for different data objects. For example, two different templates may each be generated for a different data object, but the two different templates may share an identical template identifier. Furthermore, a new template may be dynamically generated when a data object 100 undergoes a structural change, such as an addition or a deletion of an attribute, a node, and/or any other element in the data object 100.

In the example of FIG. 3, each template of the plurality of templates 300A-N is depicted as consisting of a template identifier 302, one or more fields, and one or more field identifiers. However, in some example embodiments, a template may also store other information that can be used to encode a data object 100 as a stream of property values. For example, a template may also include a field count, a field length, a bit flag, and/or a proprietary set identifier. The field count indicates a total number of fields in the template. The field length indicates a data length for a particular field of the one or more fields. As mentioned above, the bit flag indicates whether a particular field identifier of the one or more field identifiers is standardized or proprietary. If the bit flag indicates a proprietary field identifier and multiple sets of proprietary field identifiers exist, the proprietary set identifier specifies a particular set of proprietary field identifiers. An example of such a template 300A including bolded bit flags is provided below:

| Template ID = 816 | | Field Count = 4 |
|---|---|---|
| 1 | Field ID = 1 | Field Length = 4 |
| | Proprietary Set ID = 9 | |
| 1 | Field ID = 2 | Field Length = 4 |
| | Proprietary Set ID = 9 | |
| 1 | Field ID = 3 | Field Length = 4 |
| | Proprietary Set ID = 9 | |
| 1 | Field ID = 4 | Field Length = 8 |
| | Proprietary Set ID = 9 | |

4.0 Storing Property Values

Figure 4:
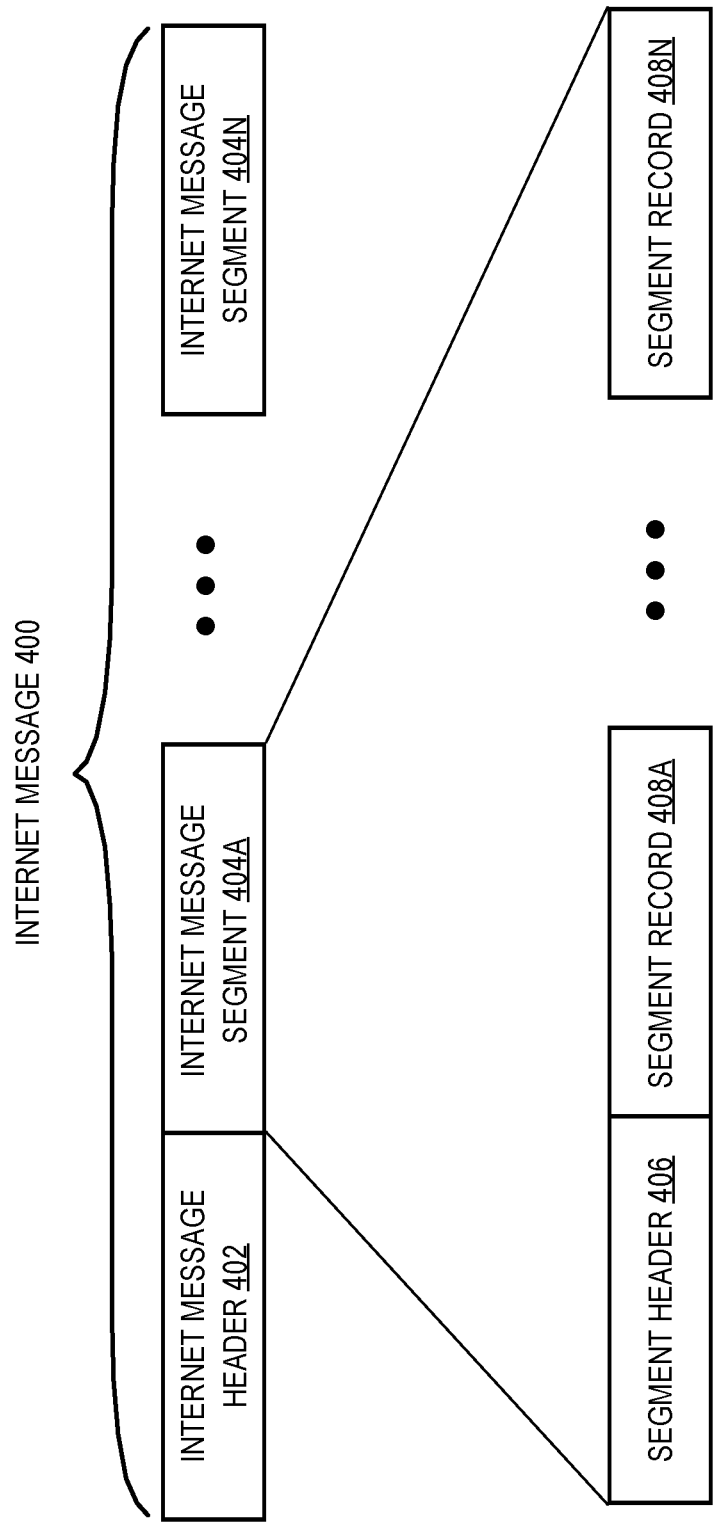
FIG. 4 depicts an example internet message comprising a plurality of internet message segments.

As mentioned above, a plurality of templates 300A-N is used to organize property values that are stored in different segments of a network message, such as an internet message. FIG. 4 depicts an example internet message comprising a plurality of internet message segments. Referring to FIG. 4, internet message 400 includes internet message header 402 and a plurality of internet message segments 404A-N. At least internet message segment 404A includes segment header 406 and a plurality of segment records 408A-N.

Internet message 400 may be a data stream, a data transmission, and/or any other set of data that can be transmitted between a pair of network nodes on the Internet. Example network nodes on the Internet include network devices, such as routers and switches, as well as network hosts, such as server computers and client computers. For example, internet message 400 may be an IPFIX message that is transmitted from a sending computing device toward a receiving computing device.

As will be described in greater detail below, internet message 400 includes a plurality of internet message segments 402A-N. In some example embodiments, internet message 400 also includes internet message header 402. Internet message header 402 includes information related to internet message 400. For example, such information may include a version number, a message length, an export timestamp, a sequence number, and/or an observation domain identifier.

4.1 Message Segments

As mentioned above, a plurality of templates 300A-N are used to organize and store property values in a plurality of internet message segments 404A-N of internet message 400. Each internet message segment of the plurality of internet message segments 404A-N corresponds to a template of the plurality of templates 300A-N. For example, internet message segment 404A may correspond to template 300A, and internet message segment 404N may correspond to template 300N. At least one internet message segment of the plurality of internet message segments 404A-N corresponds to a particular template that can be used to organize and store property values of portion 106. For example, the property values of portion 106 may be stored in internet message segment 404N in accordance with template 300N. As will be described in greater detail below, a corresponding template can be determined for a particular internet message segment based on a template identifer 302 that is stored in the particular internet message segment.

Since property types are encoded into templates using field identifiers, decoding internet message 400 involves accessing a property-type-to-field-identifier mapping 200. In some example embodiments, the property-type-to-field-identifier mapping 200 may be dynamically generated for a data object 100. However, the property-type-to-field-identifier mapping 200 changes infrequently if at all. Typically, a property-type-to-field-identifier mapping 200 remains unchanged unless a new property type is introduced into the data object 100. Thus, the property-type-to-field-identifier mapping 200 is typically transmitted separately from internet message 400. For example, a receiving computing device may retrieve the property-type-to-field-identifier mapping 200 from a sending computing device on an "as-needed" or an "on-demand" basis.

Decoding internet message 400 also involves accessing a plurality of templates 300A-N used to encode internet message 400. Like a property-type-to-field-identifier mapping 200, a template changes infrequently if at all. Thus, the plurality of templates 300A-N may be transmitted separately from internet message 400. However, the plurality of templates 300A-N may exhibit a structure that is conducive to being stored in an internet message 400. For example, the internet message 400 may be an IPFIX message that adheres to a protocol for storing templates in one or more internet message segments. In some example embodiments, the internet message 400 may include one or more additional internet message segments that store the plurality of templates 300A-N. In the example context of FIG. 4, a first plurality of internet message segments may include internet message segments 403A-N (not shown), which store a plurality of templates 300A-N, and a second plurality of internet message segments may include internet message segments 404A-N, which store property values. As will be described in greater detail below, internet message segments of the first plurality may be distinguished from internet message segments of the second plurality based on segment identifiers that are stored in internet message segments.

4.2 Segment Records

An internet message segment includes a segment header 406 and one or more segment records. In the example of FIG. 4, internet message segment 404A includes segment header 406 and a plurality of segment records 408A-N. As mentioned above, an internet message segment may store a template or property values.

In some example embodiments, an internet message segment may store one or more templates in one or more segment records of the internet message segment. For example, a single internet message segment may correspond to a single template based on storing each field of the single template in a separate segment record. As another example, a single internet message segment may include a plurality of templates 300A-N based on storing each template of the plurality of templates 300A-N in a separate segment record. An example of such an internet message segment is provided below:

| Segment ID = 2 | Segment Length = 40 Octets |
| Template ID = 816 | Field Count = 4 |
| Field ID = 1 | Field Length = 4 Octets |
| Field ID = 2 | Field Length = 4 Octets |
| Field ID = 3 | Field Length = 4 Octets |
| Field ID = 4 | Field Length = 8 Octets |
| Template ID = 817 | Field Count = 3 |
| Field ID = 5 | Field Length = 4 Octets |
| Field ID = 6 | Field Length = 2 Octets |
| Field ID = 7 | Field Length = 2 Octets |

In the example above, the bolded lines demarcate boundaries between different parts of the internet message segment. For example, the first row may correspond to a segment header 406, the next five rows may correspond to a first segment record, and the remaining rows may correspond to a second segment record. In the example above, each row corresponds to thirty-two bits, and each box within a row corresponds to sixteen bits. Thus, the segment header 406 in the example above includes the sixteen-bit segment identifier "2", which may be known a priori as indicating that the internet message segment stores one or more templates. In the example above, the segment header 406 also includes a segment length that indicates a data length of the internet message segment. The segment length can be used to determine where the internet message segment ends and where any subsequent internet message segment begins. In the example above, each segment record stores a respective template that includes a field count. The field count can be used to determine where a particular segment record ends and where any subsequent segment record begins.

In some example embodiments, an internet message segment may store property values in a plurality of segment records 408A-N. For example, each segment record of the plurality of segment records 408A-N may store a single property value. As another example, each segment record of the plurality of segment records 408A-N may store multiple property values. An example of an internet message segment that stores multiple property values in a single segment record is provided below:

| Segment ID = 817 | Segment Length = 28 Octets |
| Property Value = Jack | |
| Property Value = M | Property Value = 5 |
| | Property Value = Jill |
| Property Value = F | Property Value = 31 |
| | Property Value = Jane |
| Property Value = F | Property Value = 52 |

In the example above, a segment header 406 includes the segment identifier "817", which may be known a priori as indicating that the internet message segment stores property values according to a template corresponding to the template identifer 302 "817". For example, it may be generally agreed upon and commonly known that any segment identifiers greater than 255 correspond to template identifiers. Thus, template 300N may be used to decode each segment record of the plurality of segment records 408A-N.

5.0 Field Identifier Exhaustion

As mentioned above, there is a finite number of unique tokens in a pool. For example, a pool of two-byte tokens can theoretically have a maximum of 65,536 unique tokens. In reality, however, the maximum is typically several hundred unique tokens, because a number assignment authority typically assigns a limited number of tokens. Thus, dynamically assigning tokens to property types of a data object 100 reduces a likelihood of exhausting the pool by enabling token reuse for different data objects. However, some data objects may include a number of different property types that exceeds a number of different tokens in a pool. As will be described in greater detail below, there are various approaches for addressing such circumstances.

5.1 Data Object Subdivisions

In some example embodiments, a large data object may be divided into subdivisions that are each encoded in separate internet messages. FIG. 5 is a table that depicts an approach for dividing a large data object into subdivisions. Referring to FIG. 5, table 500 includes rows that correspond to data object 502 and a plurality of subdivisions 504A-N. Table 500 also includes columns corresponding to a number of different property types 506 and a predetermined number 508.

In the example of FIG. 5, data object 502 is a large data object that includes 500,000 different property types. However, predetermined number 508 may be a maximum number of unique tokens that can be generated using two bytes. Thus, data object 502 may be divided into a plurality of subdivisions 504A-N in such a manner that each subdivision of the plurality of subdivisions 504A-N includes a respective number of different property types that is less than or equal to predetermined number 508. A set of unique tokens may then be dynamically generated for each subdivision of the plurality of subdivisions 504A-N. For example, in subdivision 504A, the field identifer 202 "5" may correspond to the property type 102 "name", but in subdivision 504B, the field identifer 202 "5" may correspond to a different property type. Each subdivision may be treated as a separate data object. In other words, as will be described in greater detail below, each subdivision may correspond to a different subscription such that each subdivision has a separate property-type-to-field-identifier mapping and a separate set of templates.

5.2 Multiple Mappings

In some example embodiments, a large data object may be encoded in a single internet message based on generating multiple property-type-to-field-identifier mappings for the large data object. Furthermore, each template, of a plurality of templates 300A-N for the large data object, may correspond to a different property-type-to-field-identifier mapping of the multiple property-type-to-field-identifier mappings. However, such an approach may involve a mapping-to-template mapping. FIG. 6 depicts an example mapping-to-template mapping. Referring to FIG. 6, mapping-to-template mapping 600 correlates mapping identifier 602 to template identifier 302.

In the example of FIG. 6, a plurality of property-type-to-field-identifier mappings 200A-N may be generated for different parts of a large data object. In other words, a set of unique tokens may be dynamically generated for different parts of the large data object. For example, data object 100 may be a large object that has a first part and a second part. In the first part, the field identifer 202 "2" may correspond to the property type 102 "time", but in the second part, the field identifer 202 "2" may correspond to the property type 102 "location". However, multiple property-type-to-field-identifier mappings 200A-N may be used for a single data object if the multiple property-type-to-field-identifier mappings 200A-N exhibit a one-to-one relationship with a plurality of templates 300A-N for the single data object. This avoids any ambiguity as to which property type is being referenced by a particular field identifier. Since each internet message segment of a plurality of internet message segments 404A-N can correspond to a different template, a different set of tokens can be used for each internet message segment.

6.0 Example Network Topology

Figure 7:
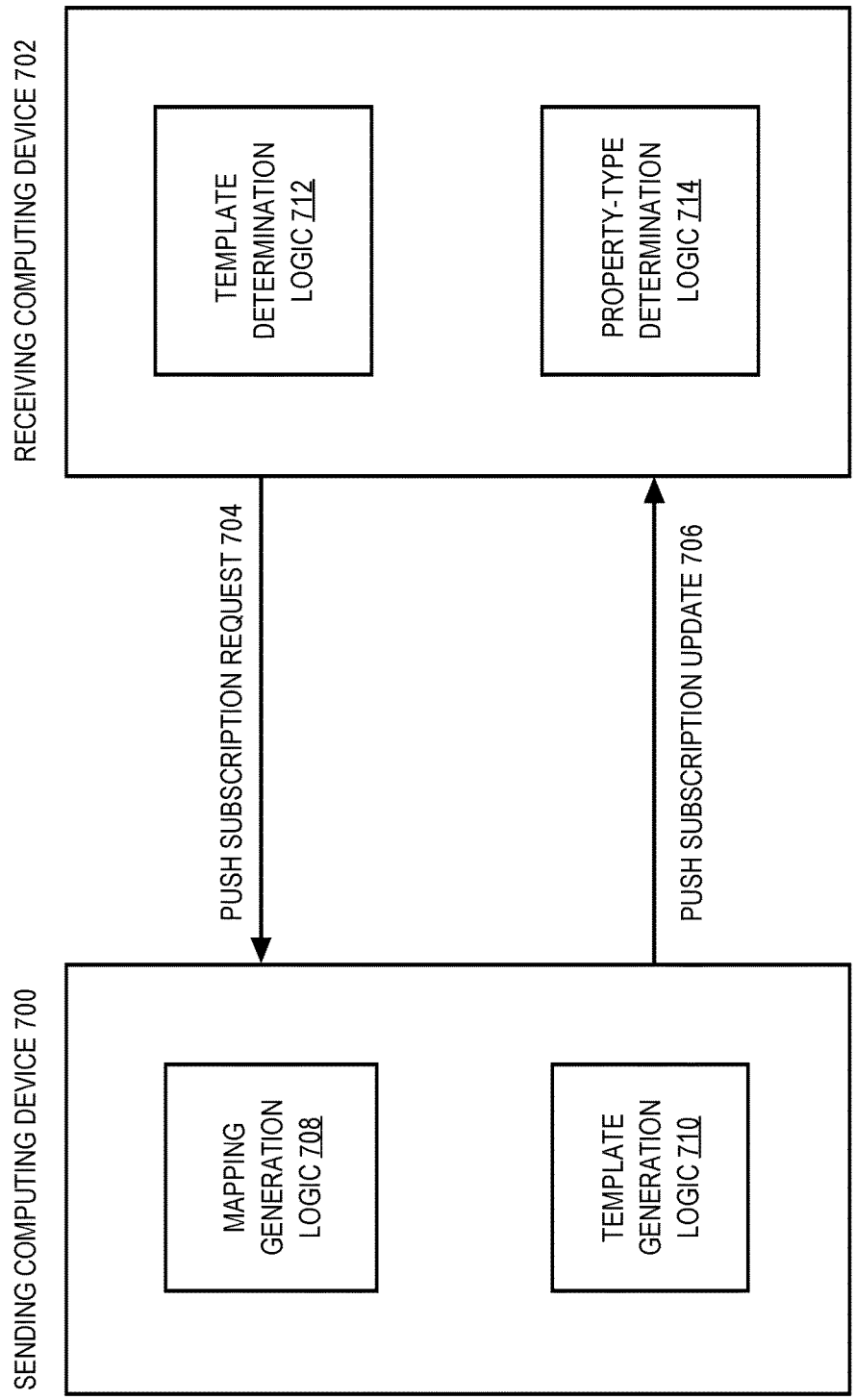
FIG. 7 depicts an example architecture comprising a sending computing device and a receiving computing device.

As mentioned above, a network message may be transmitted between a pair of network nodes, such as a sending computing device and a receiving computing device. FIG. 7 depicts an example architecture comprising a sending computing device and a receiving computing device. Referring to FIG. 7, sending computing device 700 receives push subscription request 704 from receiving computing device 702, which receives push subscription update 706 from sending computing device 700. Sending computing device 700 includes mapping generation logic 708 and template generation logic 710. Receiving computing device 702 includes template determination logic 712 and property-type determination logic 714.

In some example embodiments, a particular network node may be both a sending computing device 700 and a receiving computing device 702. For example, the particular network node may be a receiving computing device 702 relative to a first network node, and the particular network node may be a sending computing device 700 relative to a second network node. Thus, the example of FIG. 7 may depict one of many similar architectures in one or more networks.

A pair of network nodes may share a common network or may be parts of different networks. For example, sending computing device 700 and receiving computing device 702 may both be network nodes of a particular local area network (LAN). Alternatively, sending computing device 700 may be a network node of a first LAN, and receiving computing device 702 may be a network node of a second LAN.

Using one or more techniques described in any of the sections above, a network message may be efficiently transmitted based, at least in part, on compactly encoding property types. However, further efficiency can be achieved based on a publish-subscribe (pub/sub) model that enables some network messages to be almost entirely composed of property values. For example, the pub/sub model may enable some network messages to consist of property values and header data.

In some example embodiments, the pub/sub model may involve a receiving computing device 702 that generates a subscription request, such as push subscription request 704. The subscription request may cause generation of a subscription that is based on a push or pull protocol. For example, the receiving computing device 702 may request generation of a push subscription per mechanisms defined by YANG push, and IPFIX may be specified as a transport and encoding option. Advantageously, a push subscription may minimize network traffic, such as by avoiding periodic polling that may be involved with a pull protocol. Furthermore, generating the subscription per the mechanisms defined by YANG push may involve a hierarchical data model 108 that is known a priori to both the receiving computing device 702 and a sending computing device 700. IPFIX provides an existing infrastructure for network communications.

Based on the subscription request, the receiving computing device 702 may subscribe to a data object 100. When the sending computing device 700 receives the subscription request, the sending computing device 700 may generate one or more property-type-to-field-identifier mappings and a plurality of templates 300A-N for the data object 100. The one or more property-type-to-field-identifier mappings and the plurality of templates 300A-N may be associated with the subscription or distributed across multiple subscriptions. For example, when the data object 100 is a large data object, the sending computing device 700 may reject the subscription request and cause the receiving computing device 702 to generate multiple subscription requests that each specify a respective subdivision of the data object 100.

The sending computing device 700 may notify the receiving computing device 702 of the one or more property-typeto-field-identifier mappings and the plurality of templates 300A-N. For example, notification may be provided in an internet message 400 that includes property values stored in a plurality of internet message segments 404A-N. In some example embodiments, the internet message 400 may be a subscription update, such as a push subscription update 706. For example, the plurality of templates 300A-N may be stored in the internet message 400 that is transmitted as a push subscription update 706. Additionally or alternatively, notification may be provided in a separate message from the internet message 400. For example, the one or more property-type-to-field-identifier mappings may be included in a subscription confirmation message that is transmitted from the sending computing device 700 toward the receiving computing device 702.

Upon providing the receiving computing device 702 with access to the one or more property-type-to-field-identifier mappings and the plurality of templates 300A-N, the sending computing device 700 may transmit a sequence of subscription updates that are almost entirely composed of property values. The techniques described herein enable a reduced data transmission size for each subscription update, which enables subscription updates to be transmitted with greater frequency.

6.1 Sending Computing Device

Sending computing device 700 may be one or more physical computers, virtual computers, and/or computing devices. For example, sending computing device 700 may be a router, a switch, a network gateway, a server computer, a client computer, a storage device, a virtual machine instance, a virtual machine computing element, and/or a special-purpose computing device. Sending computing device 700 includes one or more processors and one or more computer-readable media coupled to the one or more processors. The one or more computer-readable media store instructions that are executed by the one or more processors.

Figure 10:
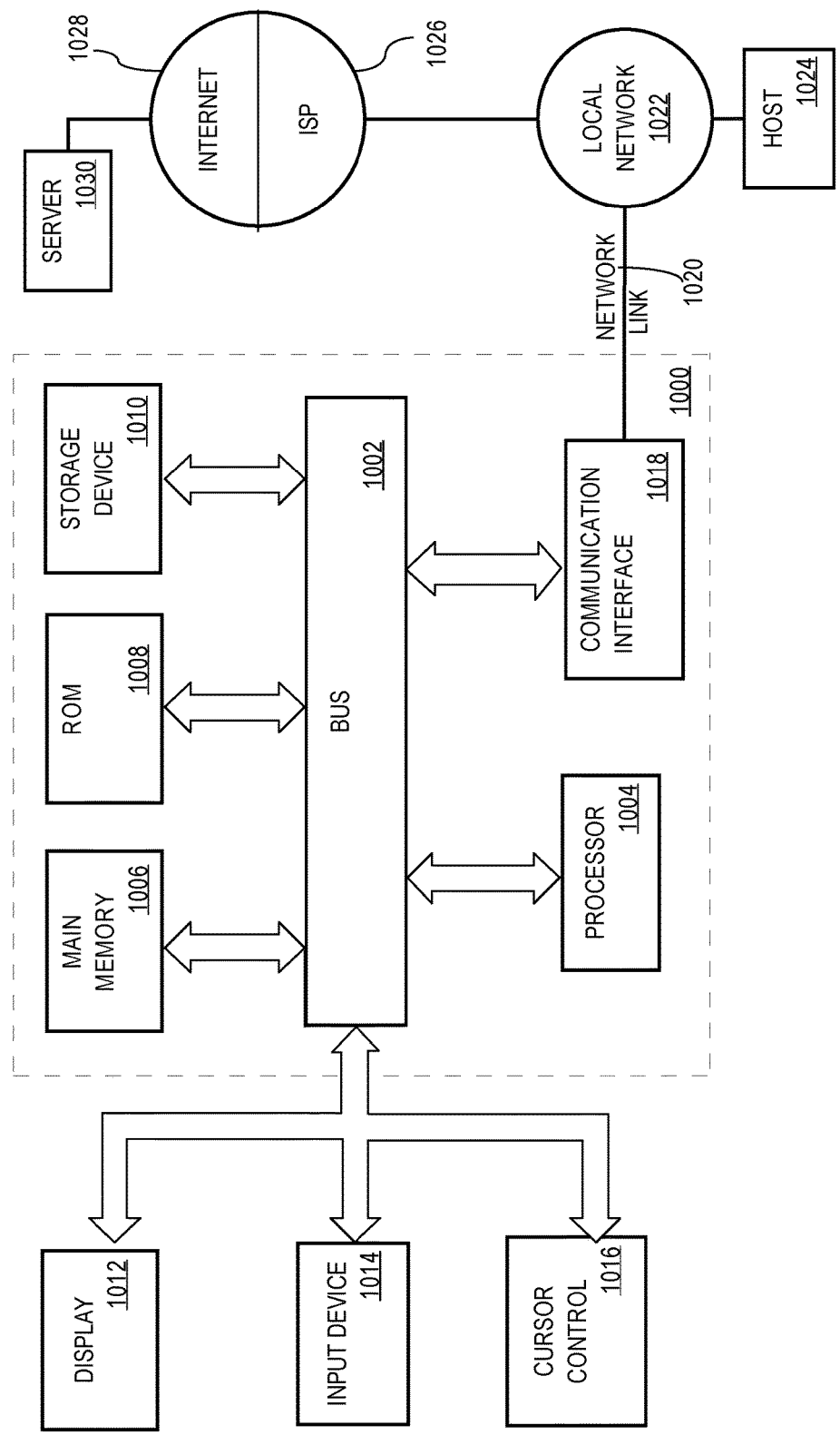
FIG. 10 depicts an example computer system upon which an embodiment may be implemented.

In the example of FIG. 7, the instructions are depicted as logical units, each of which may be implemented using any of the techniques further described herein in connection with FIG. 10. For example, sending computing device 700 may be a general-purpose computer configured with one or more stored programs which when executed cause performing the functions described herein for one or more logical units; a special-purpose computer with digital logic that is configured to execute the functions; or digital logic that is used in other computing devices. Each of the logical units may be communicatively coupled with each other and/or to a storage (not shown). The storage may be a database, a configuration file, and/or any other system and/or data structure that stores data. For example, the storage may be a YANG data store that stores a data object 100 and/or a hierarchical data model 108. The storage may include volatile and/or non-volatile memory.

6.1.1 Mapping Generation Logic

Depending on a number of different property types included in a data object 106, mapping generation logic 708 generates one or more property-type-to-field-identifier mappings for the data object 100. Thus, when sending computing device 700 receives a subscription request for the data object 106, mapping generation logic 708 determines which property types are included in the data object 100. For example, mapping generation logic 708 may parse and compare each property in the data object 100 to a stored set of different property types. If a particular property fails to match a property type in the stored set, the particular property may be added to the stored set. In some example embodiments, the stored set may be part of a property-type-to-field-identifier mapping 200. Mapping generation logic 708 then assigns a different field identifier to each property type. For example, mapping generation logic 708 may add a sequence of field identifiers to a property-type-to-field-identifier mapping 200 that includes the stored set.

Mapping generation logic 708 dynamically generates field identifiers and/or property-type-to-field-identifier mappings on a per-subscription basis. If a pool of field identifiers is exhausted, mapping generation logic 708 may cause sending computing device 700 to reject the subscription request and/or divide the property-type-to-field-identifier mapping 200 into a plurality of property-type-to-field-identifier mappings 200A-N. Dividing the property-type-to-field-identifer mapping 200 may involve terminating a first property-type-to-field-identifier mapping when the pool of field identifiers is exhausted and starting a second property-type-to-field-identifier mapping that can reuse the pool of field identifiers. Thus, mapping generation logic 708 may cause receiving computing device 702 to issue multiple subscription requests that are each associated with an identical pool of field identifiers but a different property-type-to-field-identifier mapping.

In some example embodiments, instead of causing sending computing device 700 to reject the subscription request, mapping generation logic 708 may associate the plurality of property-type-to-field-identifier mappings 200A-N with a subscription requested via the subscription request. Additionally, mapping generation logic 708 may cause template generation logic 710 to generate a respective template for each property-type-to-field-identifier mapping of the plurality of property-type-to-field-identifier mappings 200A-N. However, this may involve generating a mapping-to-template mapping 600 to correlate the plurality of property-type-to-field-identifier mappings 200A-N to a plurality of templates 300A-N. The mapping-to-template mapping 600 may also be associated with the subscription.

6.1.2 Template Generation Logic

Template generation logic 710 generates a plurality of templates 300A-N for a data object 100. For example, based on analyzing a data object 100 and/or a hierarchical data model 108, template generation logic 710 may detect a portion 106 of the data object 100 that includes multiple instances of a particular property type. In some example embodiments, the portion 106 may be a list of leaf elements or any other set of property values that share a hierarchical level. Template generation logic 710 may generate one or more templates for any such portions that are detected. For example, template generation logic 710 may generate a particular template that stores one or more field identifiers that encode property types in the portion 106. Template generation logic 710 may encode any remaining property types of the data object 100 as corresponding field identifiers in a separate template. For example, the separate template may encode all property types excluding any property types included in the portion 106.

Furthermore, template generation logic 710 assigns a respective template identifier to each template of the plurality of templates 300A-N. For example, template generation logic 710 may store a respective template identifier in each template. Thus, each template includes a template identifer 302 and one or more fields that can be used to serialize property values.

Template generation logic 710 associates the plurality of templates 300A-N with a subscription. If the data object 100 undergoes a structural change while the subscription is in effect, template generation logic 710 generates a new template reflecting the structural change and adds the new template to the plurality of templates 300A-N that are associated with the subscription.

6.2 Receiving Computing Device

As mentioned above, a network node may be a sending computing device 700 and/or a receiving computing device 702. Thus, any description of sending computing device 700 applies equally to receiving computing device 702, and vice versa.

6.2.1 Template Determination Logic

Based on a segment header 406, receiving computing device 702 determines one or more boundaries for an internet message segment. When the one or more boundaries are determined, template determination logic 712 determines a corresponding template for the internet message segment based on a template identifer 302 that is also included in the segment header 406. For example, template determination logic 712 may search for the template identifer 302 in a respective template header of each template that is associated with the subscription.

6.2.2 Property-Type Determination Logic

Based on the corresponding template for the internet message segment, receiving computing device 702 correlates property values stored in the internet message segment with field identifiers in the corresponding template. However, to translate the field identifiers into respective property types, property-type determination logic 714 determines a corresponding property type for each field identifier based on a property-type-to-field-identifier mapping 200.

In some example embodiments, receiving computing device 702 may determine a corresponding location in the data object 100 for a particular property value. For example, a hierarchical structure of the particular property value may be determined based on a hierarchical data model 108 or a property-type-to-field-identifier mapping 200 that includes property types encoded using Xpath expressions.

7.0 Encoding Process Overview

Figure 8:
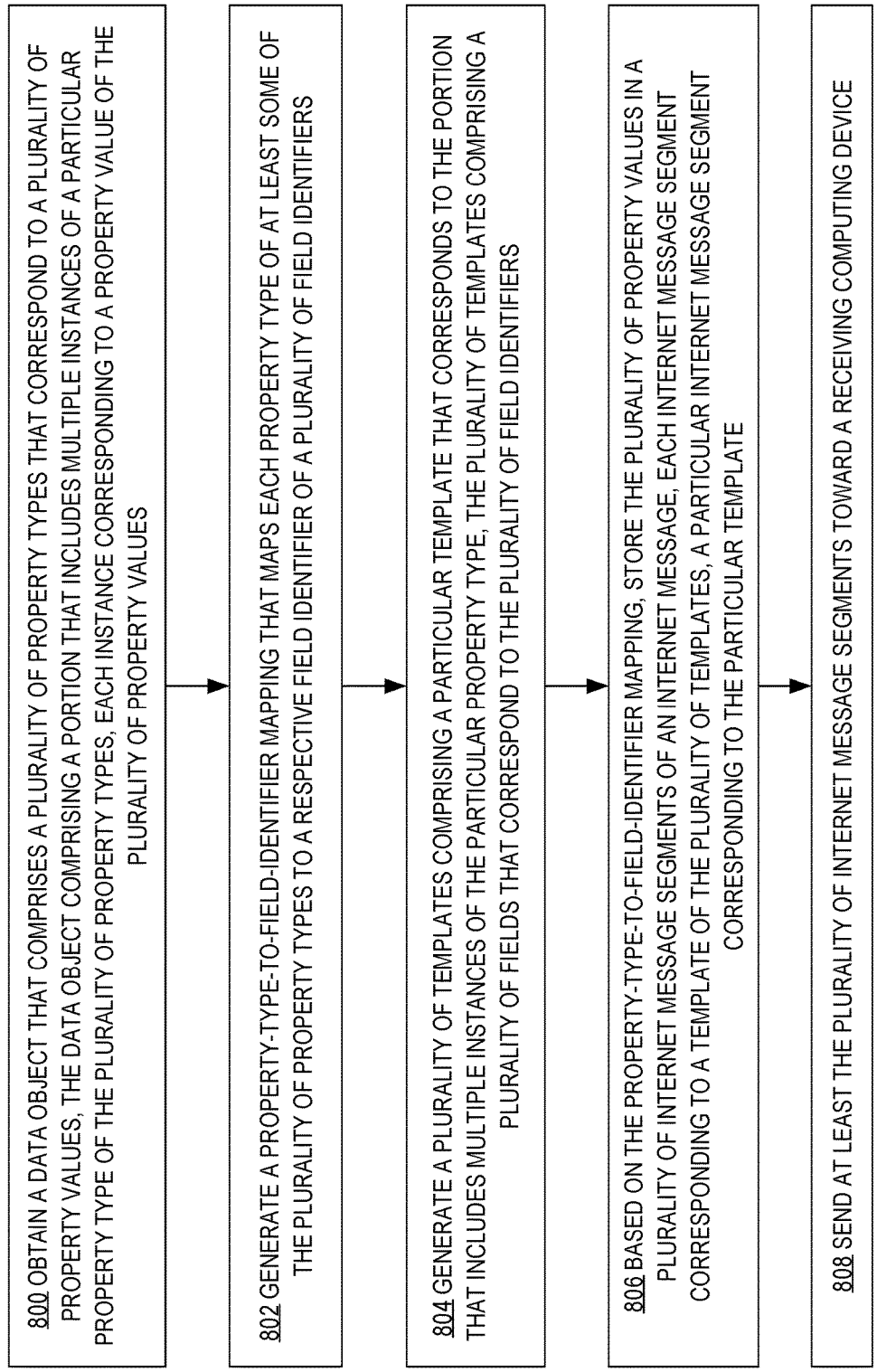
FIG. 8 is a flow diagram that depicts an approach for encoding an internet message.

FIG. 8 is a flow diagram that depicts an approach for encoding an internet message 400. The approach may be performed by a sending computing device 700.

7.1 Obtaining A Data Object

At block 800, a sending computing device 700 obtains a data object 100 that includes property types corresponding to property values. For example, the data object 100 may include data that is stored in a YANG data store and that is structured according to a hierarchical data model 108. The data object 100 includes a portion 106 that includes multiple instances of a particular property type, and each instance corresponds to a property value 104.

7.2 Generating A Property-Ttype-To-Field-Identifier Mapping

At block 802, the sending computing device 700 generates a property-type-to-field-identifier mapping 200 that maps at least some of the plurality of property types to a respective field identifier of a plurality of field identifiers. When a single property-type-to-field-identifier mapping is associated with the data object 106, the single property-type-to-field-identifier mapping maps each property type of the plurality of property types to a respective field identifier. However, when multiple property-type-to-field-identifier mappings 200A-N are associated with the data object 106, a particular property-type-to-field-identifier mapping maps each property type of some, but not all, of the plurality of property types to a respective field identifier. In some example embodiments, multiple property-type-to-field-identifier mappings 200A-N are associated with the data object 100 when the data object 100 includes a number of different property types that exceeds a predetermined maximum.

Block 802 may be performed prior to, concurrently with, or subsequent to block 804.

7.3 Generating Templates

At block 804, the sending computing device 700 generates a plurality of templates 300A-N including a plurality of fields that correspond to the plurality of field identifiers. In some example embodiments, the sending computing device 700 may associate the plurality of templates 300A-N with a subscription to the data object 100. When a single property-type-to-field-identifier mapping is associated with the data object 106, each template of the plurality of templates 300A-N corresponds to the single property-type-to-field-identifier mapping. When multiple property-type-to-field-identifier mappings 200A-N are associated with the data object 106, each template of the plurality of templates 300A-N corresponds to a different property-type-to-field-identifier mapping.

The plurality of templates 300A-N includes a particular template that corresponds to the portion 106. In some example embodiments, the particular template may include a single field that corresponds to the multiple instances of the particular property type.

7.4 Storing Property Values

At block 806, the sending computing device 700 stores the plurality of property values in an internet message 400 based, at least in part, on the property-type-to-field-identifier mapping 200. In some example embodiments, the sending computing device 700 may store the plurality of property values in the internet message 400 based on multiple property-type-to-field-identifier mappings 200A-N that are associated with the data object 100.

The internet message 400 includes a plurality of internet message segments 404A-N that store the plurality of property values. Each internet message segment corresponds to a template, and a particular internet message segment corresponds to the particular template.

7.5 Sending An Internet Message

At block 808, the sending computing device 700 sends at least the plurality of internet message segments 404A-N toward a receiving computing device 702. In some example embodiments, the sending computing device 700 may send the plurality of internet message segments 404A-N as part of a subscription update, such as a push subscription update 706.

In some example embodiments, the sending computing device 700 may send the plurality of templates 300A-N along with the plurality of internet message segments 404A-N. For example, the sending computing device 700 may send the plurality of templates 300A-N in one or more auxiliary internet message segments of the internet message 400.

In some example embodiments, the sending computing device 700 may send the property-type-to-field-identifier mapping 200 separately from the internet message 400. For example, the sending computing device 700 may incorporate the property-type-to-field-identifier mapping 200 into a hierarchical data model 108 and send the receiving computing device 702 a notification that the property-type-to-field-identifier mapping 200 can be retrieved upon demand.

8.0 Decoding Process Overview

Figure 9:
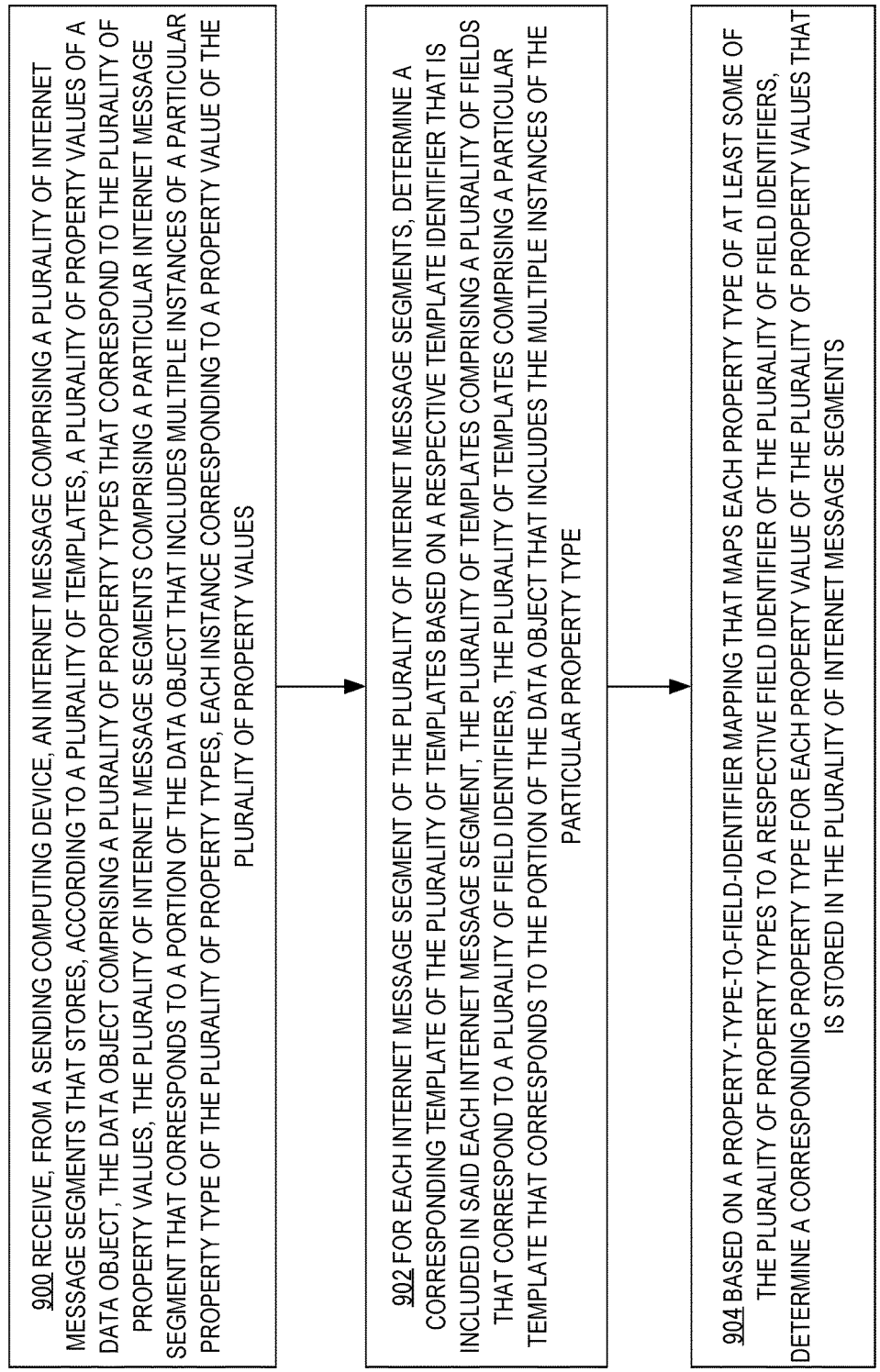
FIG. 9 is a flow diagram that depicts an approach for decoding an internet message.

FIG. 9 is a flow diagram that depicts an approach for decoding an internet message. The approach may be performed by a receiving computing device 702.

8.1 Receiving An Internet Message

At block 900, the receiving computing device 702 receives an internet message 400 from a sending computing device 700. In some example embodiments, the receiving computing device 702 may receive the internet message 400 in response to sending a subscription request to the sending computing device 700. The internet message 400 includes a plurality of internet message segments 404A-N that stores, according to a plurality of templates 300A-N, a plurality of property values of a data object 100. The data object 100 includes a plurality of property types that correspond to the plurality of property values. The plurality of internet message segments 404A-N include a particular internet message segment that corresponds to a portion 106 of the data object 100 that includes multiple instances of a particular property type. Each instance corresponds to a property value 104. In some example embodiments, the internet message 400 may be a subscription update, such as a push subscription update 706.

8.2 Determining Corresponding Templates

At block 902, the receiving computing device 702 determines a corresponding template for each internet message segment. The receiving computing device 702 determines the corresponding template based on a template identifier that is included in an internet message segment.

The plurality of templates 300A-N include a plurality of fields that correspond to a plurality of field identifiers. Furthermore, the plurality of templates 300A-N include a particular template that corresponds to the portion 106 of the data object 100 that includes the multiple instances of the particular property type.

8.3 Determining Corresponding Property Types

At block 904, the receiving computing device 702 determines a corresponding property type for each property value that is stored in the plurality of internet message segments 404A-N. The receiving computing device 702 determines the corresponding property type based on a property-type-to-field-identifier mapping 200 that maps at least some of the plurality of property types to the plurality of field identifiers.

9.0 Implementation Mechanisms-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (for example, x) and a second axis (for example, y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 101, or other non-volatile storage for later execution.

10.0 Extensions And Alternatives

In the foregoing specification, the example embodiment(s) have been described with reference to numerous specific details. However, the details may vary from implementation to implementation according to the requirements of the particular implementation at hand. The example embodiment(s) are, accordingly, to be regarded in an illustrative rather than a restrictive sense.

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A data encoding method performed at a sending computing device, the data encoding method comprising:
   obtaining a digital data object that comprises a plurality of property types that correspond to a plurality of property values, the data object comprising a portion that includes multiple instances of a particular property type of the plurality of property types, each instance corresponding to a property value of the plurality of property values;
   generating a property-type-to-field-identifier mapping that maps each property type of at least some of the plurality of property types to a respective field identifier of a plurality of field identifiers;
   generating a plurality of templates comprising a particular template that corresponds to the portion that includes multiple instances of the particular property type, the plurality of templates comprising a plurality of fields that correspond to the plurality of field identifiers;

based on the property-type-to-field-identifier mapping, storing the plurality of property values in a plurality of internet message segments of an internet message, each internet message segment of the plurality of internet message segments corresponding to a template of the plurality of templates, a particular internet message segment of the plurality of internet message segments corresponding to the particular template of the plurality of templates;

electronically sending at least the plurality of internet message segments toward a receiving computing device.

2. The data encoding method of claim 1, wherein the particular template comprises a single field that corresponds to the multiple instances of the particular property type.

3. The data encoding method of claim 1, wherein sending at least the plurality of internet message segments toward the receiving computing device includes sending the plurality of internet message segments as part of a push subscription update.

4. The data encoding method of claim 1, wherein the data object is structured according to a hierarchical data model.

5. The data encoding method of claim 1, wherein the data object corresponds to a subdivision of a plurality of subdivisions into which a larger data object is divided when the larger data object comprises a number of different property types that exceeds a predetermined number of different property types.

6. The data encoding method of claim 1, wherein the property-type-to-field-identifier mapping is one of multiple property-type-to-field-identifier mappings for the data object, each template of the plurality of templates corresponding to a different property-type-to-field-identifier mapping of the multiple property-type-to-field-identifier mappings.

7. The data encoding method of claim 1, wherein sending at least the plurality of internet message segments toward the receiving computing device includes sending the plurality of templates in the internet message.

8. The data encoding method of claim 1, wherein sending at least the plurality of internet message segments toward the receiving computing device includes sending the internet message separately from the property-type-to-field-identifier mapping.

9. A data decoding method performed at a receiving computing device, the data decoding method comprising:

electronically receiving, from a sending computing device, an internet message comprising a plurality of internet message segments that stores, according to a plurality of templates, a plurality of property values of a digital data object, the data object comprising a plurality of property types that correspond to the plurality of property values, the plurality of internet message segments comprising a particular internet message segment that corresponds to a portion of the data object that includes multiple instances of a particular property type of the plurality of property types, each instance corresponding to a property value of the plurality of property values;

for each internet message segment of the plurality of internet message segments, determining a corresponding template of the plurality of templates based on a respective template identifier that is included in said each internet message segment, the plurality of templates comprising a plurality of fields that correspond to a plurality of field identifiers, the plurality of templates comprising a particular template that corresponds to the portion of the data object that includes the multiple instances of the particular property type;

based on a property-type-to-field-identifier mapping that maps each property type of at least some of the plurality of property types to a respective field identifier of the plurality of field identifiers, determining a corresponding property type for each property value of the plurality of property values that is stored in the plurality of internet message segments.

10. The data decoding method of claim 9, wherein the particular template comprises a single field that corresponds to the multiple instances of the particular property type.

11. The data decoding method of claim 9, wherein the plurality of internet message segments is part of a push subscription update.

12. The data decoding method of claim 9, wherein the data object is structured according to a hierarchical data model.

13. A sending computing device comprising:
one or more digital data processors; and
one or more computer-readable media storing instructions which, when executed by the one or more processors, cause the one or more processors to execute:
electronically obtaining a digital data object that comprises a plurality of property types that correspond to a plurality of property values, the data object comprising a portion that includes multiple instances of a particular property type of the plurality of property types, each instance corresponding to a property value of the plurality of property values;
generating a property-type-to-field-identifier mapping that maps each property type of at least some of the plurality of property types to a respective field identifier of a plurality of field identifiers;
generating a plurality of templates comprising a particular template that corresponds to the portion that includes multiple instances of the particular property type, the plurality of templates comprising a plurality of fields that correspond to the plurality of field identifiers;
based on the property-type-to-field-identifier mapping, storing the plurality of property values in a plurality of internet message segments of an internet message, each internet message segment of the plurality of internet message segments corresponding to a template of the plurality of templates, a particular internet message segment of the plurality of internet message segments corresponding to the particular template of the plurality of templates;
sending at least the plurality of internet message segments toward a receiving computing device.

14. The sending computing device of claim 13, wherein the particular template comprises a single field that corresponds to the multiple instances of the particular property type.

15. The sending computing device of claim 13, wherein sending at least the plurality of internet message segments toward the receiving computing device includes sending the plurality of internet message segments as part of a push subscription update.

16. The sending computing device of claim 13, wherein the data object is structured according to a hierarchical data model.

17. The sending computing device of claim 13, wherein the data object corresponds to a subdivision of a plurality of subdivisions into which a larger data object is divided when the larger data object comprises a number of different property types that exceeds a predetermined number of different property types.

18. The sending computing device of claim 13, wherein the property-type-to-field-identifier mapping is one of multiple property-type-to-field-identifier mappings for the data object, each template of the plurality of templates corresponding to a different property-type-to-field-identifier mapping of the multiple property-type-to-field-identifier mappings.

19. The sending computing device of claim 13, wherein sending at least the plurality of internet message segments toward the receiving computing device includes sending the plurality of templates in the internet message.

20. The sending computing device of claim 13, wherein sending at least the plurality of internet message segments toward the receiving computing device includes sending the internet message separately from the property-type-to-field-identifier mapping.

* * * * *